United States Patent [19]

Watanabe

[11] Patent Number: 4,792,734

[45] Date of Patent: Dec. 20, 1988

[54] STEPLESS SPEED CHANGE ELECTRIC CHAIN BLOCK

[75] Inventor: Hisatsugu Watanabe, Yamanashi, Japan

[73] Assignee: Kabushiki Kaisha Kito, Yamanashi, Japan

[21] Appl. No.: 53,785

[22] Filed: May 26, 1987

[30] Foreign Application Priority Data

May 23, 1986 [JP] Japan ............................ 61-78725[U]

[51] Int. Cl.[4] .......................... H02P 3/16; B66D 1/12

[52] U.S. Cl. .................................... 318/269; 318/331; 318/345 H; 318/372; 318/375; 254/362

[58] Field of Search .................... 318/269, 331, 345 C, 318/345 D, 345 F, 345 G, 345 H, 372, 375; 254/316, 340, 362

[56] References Cited

U.S. PATENT DOCUMENTS

| | | | |
|---|---|---|---|
| 2,956,779 | 10/1960 | Prichard | 254/362 |
| 3,678,360 | 7/1972 | Minarik et al. | 318/345 D X |
| 3,742,337 | 6/1973 | Digneffe | 318/345 D X |
| 3,783,361 | 1/1974 | Mason | 318/331 |
| 3,784,165 | 1/1974 | Pruitt | 254/362 X |
| 3,857,076 | 12/1974 | Hetland | 318/345 D X |

*Primary Examiner*—Bentsu Ro

*Attorney, Agent, or Firm*—Sughrue, Mion, Zinn, Macpeak, and Seas

[57] ABSTRACT

A stepless speed change electric chain block includes a DC motor for driving a load sheave. The chain block comprises a phase control circuit having a variable resistor, a capacitor, a two-way trigger diode, and a triode AC switch for receiving alternating current from alternating power source to control it in phase, a full-wave-rectifier for receiving alternating current controlled in phase in the phase control circuit to convert it into direct current which is supplied into the DC motor, and mechanical brake means provided in a transmission between the DC motor and the load sheave for braking rotation of the load sheave in a winding-off direction. With this arrangement, as the speed setting for winding operation is effected only by the phase control circuit, so that the constitution of the block is simplified and inexpensive in comparison with the prior art. All the supplied power is effectively utilized for operating the chain block. A load is always wound-off at a set speed safely and is securely held at the stopped position during the stoppage of the chain block.

2 Claims, 5 Drawing Sheets

FIG_2a
FIG_2b
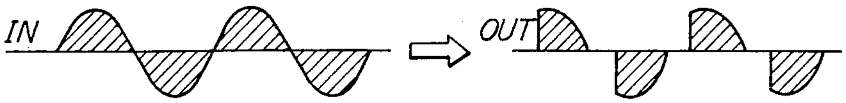
FIG_3a
Normal Rotation
FIG_3b
Reverse Rotation
FIG_4a
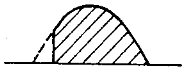
FIG_4b

STEPLESS SPEED CHANGE ELECTRIC CHAIN BLOCK

BACKGROUND OF THE INVENTION

This invention relates to a stepless speed change electric chain block capable of changing lifting and lowering speeds in stepless manner.

The assignee of this case has proposed a stepless speed change electric chain block (Japanese Laid-open Patent Application No. 55-156,194). The proposed stepless speed change electric chain block is of small size and light weight and economical in use because stepless speed change of a load sheave is accomplished by the use of an AC motor without using a DC power source. Moreover, the proposed stepless speed change electric chain block comprises screw thread type mechanical brake means provided in a transmission mechanism between the AC motor and the load sheave for automatically preventing the load sheave from being rotated in a winding-off direction due to a load. The load sheave is therefore prevented from being rotated in the lowering direction at higher speeds than those of a rotor of the motor, no matter how large the torque due to the load. Accordingly, the proposed electric chain block can carry out the lowering operation at safe and stable speeds.

On the other hand, however, the proposed electric chain block requires a tachometer for detecting speeds and a voltage comparison circuit for setting the speed of the load sheave, whose control system becomes unavoidably complicated.

SUMMARY OF THE INVENTION

It is a primary object of the invention to provide an improved stepless speed change electric chain block which eliminates the disadvantage of the prior art and which is simple in construction maintaining the advantageous characteristics of the above prior stepless speed change electric chain block.

In order to achieve this object, a stepless speed change electric chain block including a DC motor for driving a load sheave according to the invention comprises a phase control circuit having a variable resistor, a capacitor, a two-way trigger diode, a triode AC switch and the like for receiving alternating current from alternating power source the phase of the A.C. current a full-wave-rectifying circuit for receiving alternating current controlled in phase in said phase control circuit to convert it into direct current which is supplied into the DC motor, and mechanical brake means provided in a transmission between said DC motor and said load sheave for braking rotation of the load sheave in a winding-off direction.

In a preferred embodiment of the invention, the variable resistor and the capacitor are connected in series to each other, and the two-way trigger diode and the triode AC switch are connected in series to each other and are connected in parallel with the variable resistor, and the triode AC switch is connected in parallel with the variable resistor and the capacitor.

The mechanical brake means preferably comprises a cam support rotatably and axially slidably fitted on a load sheave shaft, a retainer disc fitted on the load sheave shaft axially slidably but nonrotatably relative thereto, a brake receiving disc fitted on the load sheave shaft axially slidably but nonrotatably relative thereto, a ratchet wheel rotatably fitted on a boss of the brake receiving disc, a pawl pivotally mounted on a stationary member of the block and urged into engagement with the ratchet wheel by resilient means, an intermediate driven gear fitted on said cam support axially slidably but against rotation thereto, resiliently urging means for holding said ratchet wheel through said retainer disc, said brake receiving disc and the intermediate drive gear, and brake releasing cam members received in cam grooves each formed in one side of the cam support and having a sloped bottom to change its depth, thereby causing said brake releasing cam members to move into deeper positions in the cam grooves when the cam support is rotated in a lifting direction, and into shallower positions in the cam grooves when the cam support is rotated in a lowering direction.

With the above arrangement, as the speed setting for lifting or lowering a load is effected only by the phase control circuit. The constitution of the chain block is therefore simplified in comparison with the chain block of the prior art. The phase control circuit used in the invention is inexpensive in comparison with the case using SCR (silicon controlled rectifier), inasmuch as the phase control circuit comprises the variable resistor, the capacitor, the two-way trigger diode, the triode AC switch and the like. Moreover, since the alternate current is controlled in phase in the phase control circuit whose output is converted into the direct current in the full-wave rectifying circuit, all of the supplied power is effectively utilized for operating the chain block. Furthermore, as there is provided the mechanical brake in the transmission between the DC motor and the load sheave for braking the rotation of the load sheave in the lowering direction, a load is always wound-off at a set speed safely. Moreover, the load is securely held at its stopped position during the stoppage of the electric chain block.

The invention will be more fully understood by referring to the following detailed specification and claims taken in connection with the appended drawings.

BRIEF DESCRIPTION OF THE DRAWINGS

FIG. 2*a* illustrates a waveform of input received in the phase control circuit used in the chain block according to the invention;

FIG. 2*b* illustrates a waveform of output from the phase control circuit;

FIG. 3*a* shows a waveform of input when the DC motor is energized in the normal rotating direction;

FIG. 3*b* shows a waveform of input when the DC motor is energized in the reverse rotating direction;

FIGS. 4*a* and 4*b* illustrate waveforms of output from the phase control circuit;

DESCRIPTION OF THE PREFERRED EMBODIMENT

First, a control circuit for the stepless speed change electric chain block according to the invention will be explained in detail.

Figure 1:
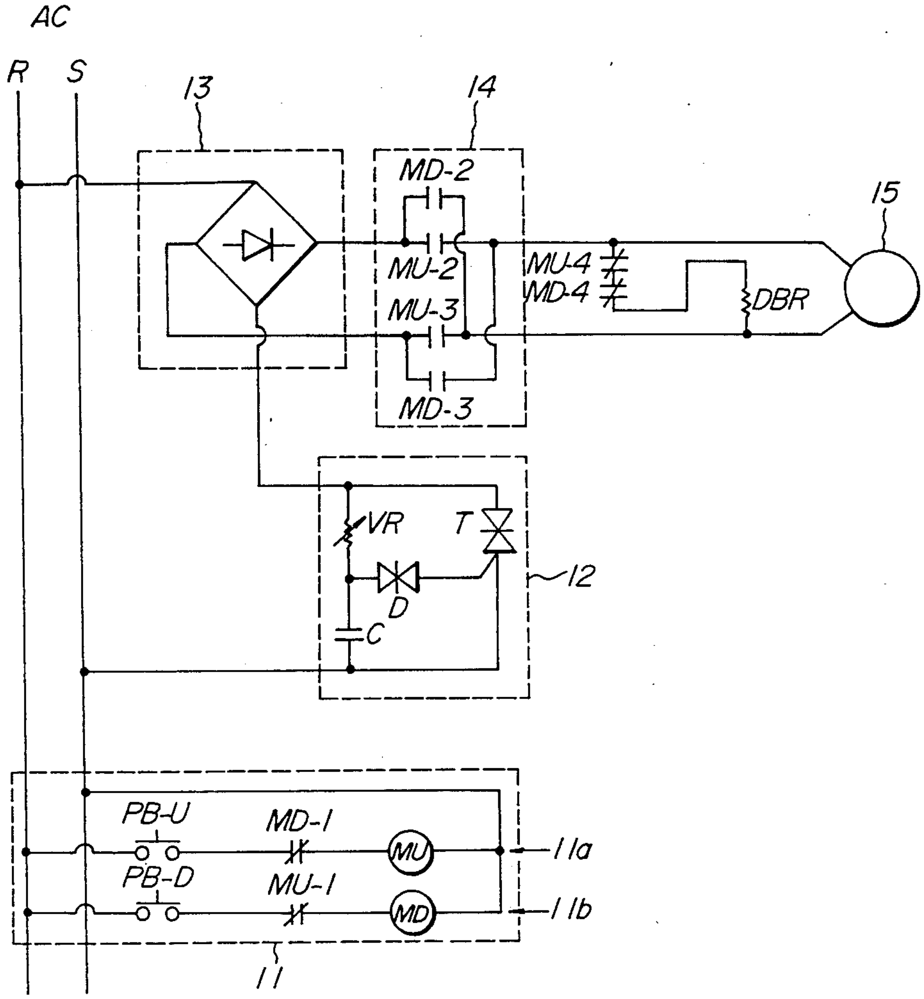
FIG. 1 is a control circuit for the stepless speed change electric chain block according to the invention.

FIG. 1 illustrates a control circuit for use in the stepless speed change electric chain block according to the invention, which comprises an operating circuit 11, a phase control circuit 12, a full-wave rectifying circuit 13, a normal and reverse rotating circuit 14, a dynamic brake resistor DBR and a DC motor 15. The operating circuit 11 consists of a lifting circuit 11a and a lowering circuit 11b. The lifting circuit 11a is a series circuit of a push-button switch PB-U for the lifting operation, a normally closed contact pair MD-1 of a relay MD for the lowering operation, and a relay MU for the lifting operation. The lowering circuit 11b is a series circuit of a push-button switch PB-D for the lowering operation, a normally closed contact pair MU-1 of a relay MU for the lifting operation and a relay MD for the lowering operation. The phase control circuit 12 comprises a variable resistor VR for setting speeds, a capacitor C, a two-way trigger diode D and a triode AC switch T. The normal and reverse rotating circuit 14 comprises normally opened contact pairs MU-2 and MU-3 of a relay MU for the lifting operation, and normally opened contact pairs MD-2 and MD-3 of a relay MD for the lowering operation. To a dynamic brake resistor DBR are connected in series a normally closed contact pair MU-4 of a relay MU for the lifting operation and a normally closed contact pair MD-4 of a relay MD for the lowering operation.

With the control circuit constructed as above described, when the push-button switch PB-U for the lifting operation is pressed, the relay MU for the lifting operation is actuated by the alternate current from an AC power source through the push-button switch PB-U and the normally closed contact pair MD-1 to close the normally opened contact pairs MU-2 and MU-3 of the relay MU and to open the normally closed contact pairs of MU-1 and MU-4 of the relay MU. As a result, the alternate current from the AC power source is controlled in phase in the phase control circuit 12 and then full-wave-rectified in the full-wave rectifying circuit 13. The rectified current is supplied into the DC motor 15 to energize it in a normal rotating direction to rotate the load sheave in a normal rotating direction. At this moment, as the normally closed contact pair MU-4 of the relay MU for the lifting operation is kept opened, any direct current does not flow through the dynamic brake resistor DBR, so that dynamic braking is not effected.

When the push-button switch PB-U for the lifting operation is released, the relay MU for the lifting operation becomes inoperative to open the normally opened contact pairs MU-2 and MU-3 and close the normally closed contact pairs MU-1 and MU-4 of the relay MU. As a result, the direct current to the DC motor 15 is interrupted, and the power generated in the DC motor during the rotation of its rotor due to inertia is consumed in the dynamic brake resistor DBR so that the rotation of the rotor is decelerated at a moderate deceleration.

Moreover, if the push-button switch PB-D for the lowering operation is pressed, the relay MD for the lowering operation is actuated by the alternate current from the AC power source through the push-button switch PB-D and the normally closed contact pairs MU-1 to close the normally opened contact pairs MD-2 and MD-3 and to open the normally closed contact pairs MD-1 and MD-4. As a result, the alternate current from the AC power source is controlled in phase in the phase control circuit 12 and then full-wave-rectified in the full-wave rectifying circuit 13. The rectified current having a polarity opposite to that in the normal rotation of the DC motor is supplied to the DC motor to energize the DC motor in a reverse direction to rotate the load sheave in a reverse rotating direction. At this time, as the normally closed contact pair MD-4 of the relay MD for the lowering operation is maintained opened, any direct current does not flow through the dynamic brake resistor DBR, so that the dynamic braking is not effected.

When the push-button switch PB-D for the lowering operation is released, the relay DM for the lowering operation becomes inoperative to open the normally opened contact pairs MD-2 and MD-3 and close the normally closed contact pairs MD-1 and MD-4. As a result, the direct current to the DC motor 15 is interrupted, and the power generated in the DC motor during the rotation of its rotor due to inertia is consumed in the dynamic bake resistor DBR so that the rotation of the rotor is decelerated at a moderate deceleration.

FIGS. 2a and 2b illustrate input and output waveforms at the phase control circuit 12. The input A.C. IN sinusoidal wave as shown in FIG. 2a is controlled in phase in the phase control circuit 12 into the A.C. waveform as shown in FIG. 2b. The A.C. waveform shown in FIG. 2b is full-wave-rectified in the full-wave rectifying circuit 13 into direct current of a waveform shown in FIG. 3a or FIG. 3b, either of which is supplied to the DC motor 15 according to the lifting or lowering operation, that is, the normal or reverse rotation of the DC motor 15.

The power to be supplied to the DC motor 15 is adjusted by adjusting the variable resistor VR for setting speeds in the phase control circuit 12. In other words, when the resistance of the variable resistor VR is low, the power to be supplied to the DC motor 15 is large as shown in FIG. 4a. On the other hand, if the resistance is high, the power to the DC motor 15 is small as shown in FIG. 4b.

The construction of the mechanical portion in the stepless variable speed change electric chain block according to the invention will be explained hereinafter.

Figure 5:
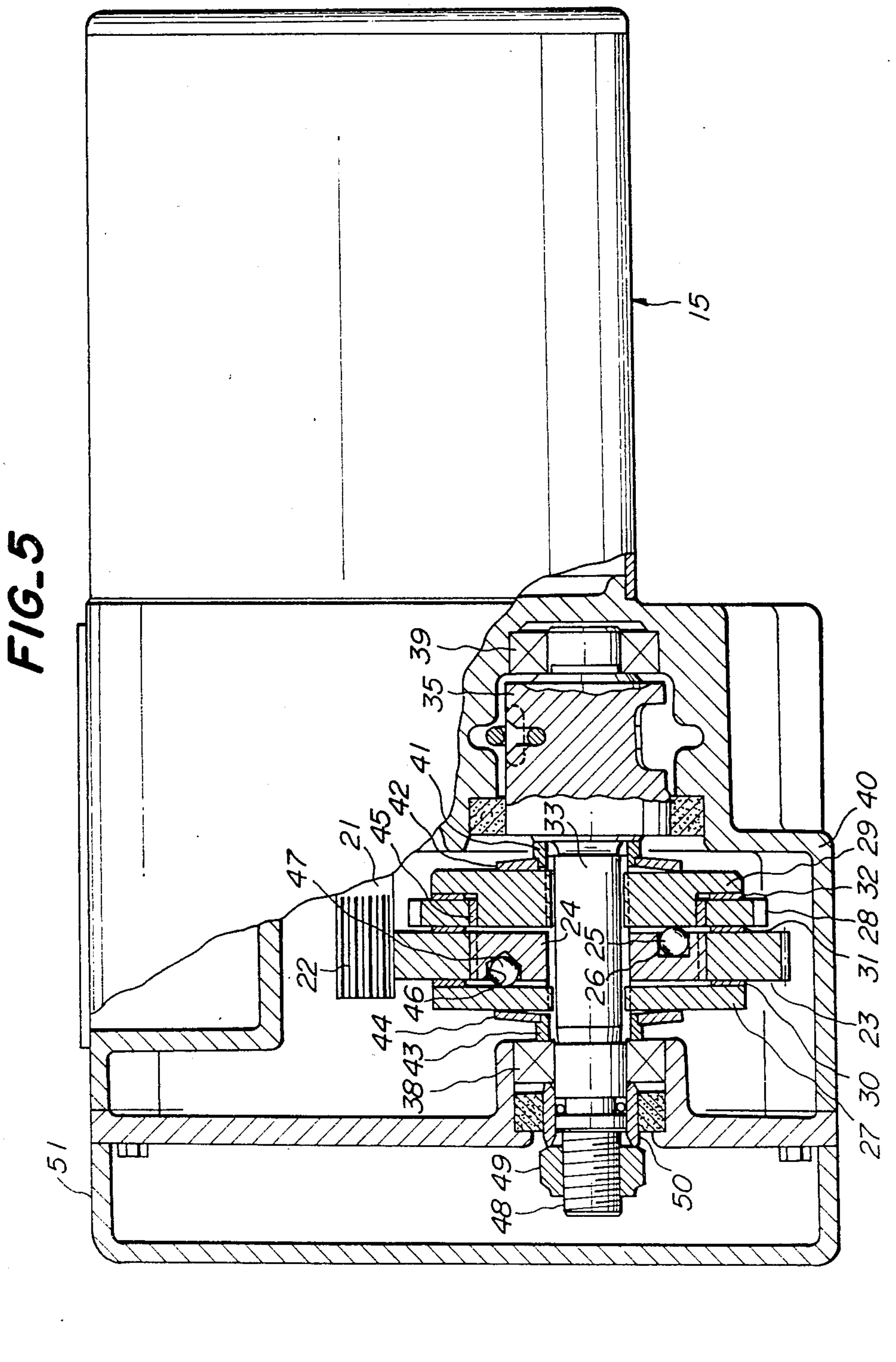
FIG. 5 is a partially sectional side view illustrating a mechanical part of the chain block according to the invention.

FIG. 5 is partial sectional view illustrating the mechanical portion of the stepless variable speed change electric chain block according to the invention. The mechanical portion of this chain block is substantially similar in construction to that of a U.S. patent application Ser. No. 832,788 filed by the assignee of the case.

As shown in FIG. 5 a load sheave shaft 33 integral with a load sheave 35 is journaled by bearings 38 and 39 in the gear box 40 in parallel with a driving shaft 21 formed at one end with a driving gear 22. A support ring 41 is fitted on the load sheave shaft 33 to engage one end of the load sheave 35 and is further fitted on a center hole of a support member 42 in the form of a dish-shaped spring made of a spring steel. Moreover, an urging ring 43 made of steel is fitted on the other end of the load sheave shaft 33 to engage the bearing 38 and further fitted in a center hole of an urging member 44 in the form of a dish-shaped spring made of a spring steel.

Figure 8:
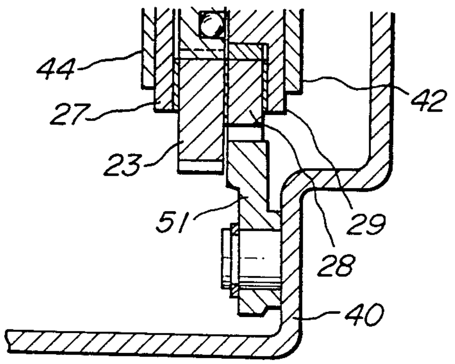
FIG. 8 is a partial sectional view illustrating a pawl to be engaged with a ratchet wheel used in a brake assembly shown in FIG. 5.

A cam support 24 made of steel is rotatably and axially slidably fitted on a mid-portion of the load sheave shaft 33 between the support member 42 and the urging member 44. A steel retainer disc 27 located between the cam support 24 and the urging member 44 is fitted on the load sheave shaft 33 axially slidably but nonrotatably relative thereto. A brake receiving disc 29 positioned between the cam support 24 and the support member 42 is also fitted on the load sheave shaft 33 axially slidably but nonrotatably relative thereto. A ratchet wheel 28 for braking is rotatably fitted on a boss of the brake receiving disc 29 through a sleeve bearing 45. A pawl 51 for braking (FIG. 8) is pivotally mounted on the gear box and is urged into engagement with the ratchet wheel 28 by means of a spring (not shown).

Figure 6:
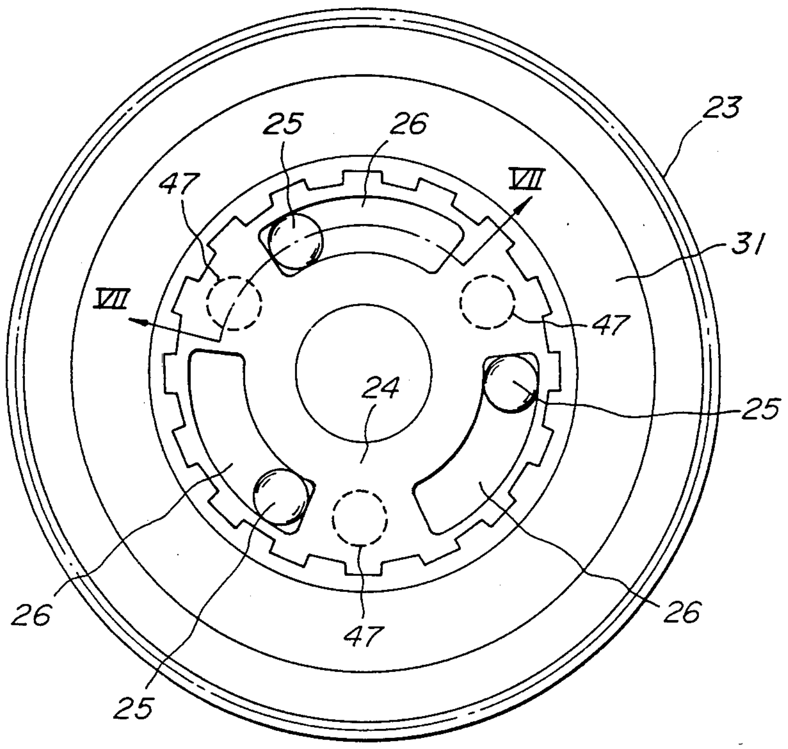
FIG. 6 is a front elevation illustrating spherical bodies and cam support provided in an intermediate driven gear of the chain block shown in FIG. 5.

An intermediate, driven gear 23 is fitted on an outer circumference of the cam support 24 axially slidably but against rotation relative thereto. Friction plates 30 and 31 are fixed to side surfaces of the driven gear 23, respectively, by means of welding, adhesive or the like. A friction plate 32 positioned between the ratchet wheel 28 and a flange of the brake receiving disc 29 is fixed to a side surface of the ratchet wheel 28 by means of adhesive. The cam support 24 is formed on a side of the brake receiving disc 29 with a plurality of cam grooves 26 in the form of arcs circumferentially spaced apart from each other and concentric to the load sheave shaft 33 as shown in FIG. 6. Each cam groove 26 has a sloped bottom to change the depth of the groove and receives a brake releasing cam member 25 in the form of a steel ball. Moreover, the cam support 24 is formed on a side of the retainer disc 27 with a plurality of recesses 46 circumferentially spaced apart from each other in a circle concentric to the load sheave shaft 33 for receiving steel balls 47.

An external screw-thread portion 48 provided on the other end of the load sheave shaft 33 extends outwardly from the gear box 40. An adjusting nut 49 is threadedly engaged with the external screw-thread portion 48 of the load sheave shaft 33 out of the gear box 40 and at the same time engages one end of the collar 50. A tightening force of the adjusting nut 49 urges the central portion of the urging member 44 through the collar 50, the bearing 38 and the urging ring 43 to clamp the retainer disc 27, the intermediate driven gear 23, the ratchet wheel 28, the flange of the brake receiving disc 29 and the friction plates 30, 31 and 32 interposed therebetween with the aid of the support member 42 and the urging member 44.

In this embodiment, a torque limiter is constructed by the urging member 44 and the support member 42 and the intermediate driven gear 23, the retainer disc 27, the brake receiving disc 29, the ratchet wheel 28, and the friction plates 30, 31 and 32 between the members 44 and 42. Moreover, a mechanical brake assembly for preventing the load from dropping is formed by the pawl 51 adapted to engage the ratchet wheel 28; the cam support 24 having cam grooves 26; the brake releasing cam members 25. The the ratchet wheel 28 held through the retainer disc 27, the brake receiving disc 29, the intermediate driven gear 23 and the friction plates by the spring forces of the support member 42 and the urging member 44.

In order to adjust the transmission torque of the torque limiter after the electric chain block has been assembled, such an adjustment is performed by simply rotating the adjusting nut 49 out of the gear box after an electric equipment receiving cover 51 has been removed without requiring disassembling of the electric chain block.

With the above arrangement, when the push-button switch PB-U for the lifting operation in the operating circuit is pressed to energize the DC motor 15 so as to rotate a driving shaft 21 in a lifting direction, a driving gear 22 of the driving shaft 21 is driven to cause a cam support 24 to rotate through a driven gear 23 in a direction shown by an arrow A in FIG. 4. The brake releasing cam members 25 are therefore located at deeper positions in the cam grooves 26 (FIGS. 6 and 7), so that the intermediate driven gear 23, the retainer disc 27, the ratchet wheel 28, the brake receiving disc 29 and the friction plates 30, 31 and 32 are clamped by the preset clamping force. Accordingly, the rotation of the intermediate driven gear 23 is transmitted through the retainer disc 27 and the brake receiving disc 29 to the load sheave shaft 33 and the load sheave 35, thereby effecting the lifting operation within the torque set by the torque limiter.

Figure 7:
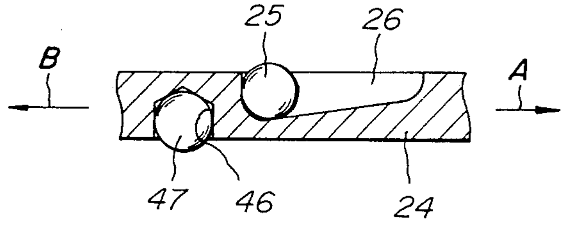
FIG. 7 is a sectional view taken along lines VII—VII in FIG. 6.

When the push-button switch PB-D for the lifting operation in the operating circuit is pressed, the DC motor 15 is energized in the reverse direction to cause the driving shaft 21 to rotate in the lowering direction, so that the cam support 24 is rotated in a reverse direction, i.e. in the direction shown by an arrow B in FIG. 7 by the driving gear 22 through the intermediate driven gear 23. Accordingly the brake releasing cam members 25 are moved into shallower positions in the cam grooves 26 to extend higher from the side surface of the cam support 24, so that the cam support 24 and the brake receiving disc 29 move away from each other by the extending action of the brake releasing cam members 25. As a result, the mechanical brake assembly is released so that the load sheave 35 is rotated by a weight of the load faster than the rotating speed driven by the DC motor 15. However, such a rotation of the load sheave 35 results in clamping of the mechanical brake assembly, so that the lowering operation is performed at a speed substantially equal or near to the speed driven by the DC motor by the repetition of the releasing and clamping of the brake assembly.

When the DC motor 15 is deenergized after the load is raised or lowered to a desired height, the transmission mechanism of the block tends to rotate in a reverse direction by the weight of the load. However, such a rotation will clamp the mechanical brake assembly into a unitary body, and after the brake assembly has been clamped, the further rotation will be prevented by the pawl 28 and the ratchet wheel 51.

As can be seen from the above explanation, the stepless speed change electric chain block according to the invention brings about the following significant effects.

(1) The speed setting for lifting or lowering a load is effected only by the phase control circuit. The constitution of the chain block is simplified as a whole without requiring any tachometer for detecting the winding speed, a voltage comparison circuit and the like which would be needed for speed control devices of the prior art.

(2) The phase control circuit used in the invention is inexpensive in comparison with the case using SCR (silicon controlled rectifer), inasmuch as the phase control circuit comprises the variable resistor, the capacitor, the two-way trigger diode, the triode AC switch and the like.

(3) Since the alternating current is controlled in phase in the phase control circuit whose output is converted into the direct current in the full-wave rectifying circuit, all the supplied power is effectively utilized for operating the chain block.

(4) Since there is provided the mechanical brake in the transmission between the DC motor and the load sheave for braking the rotation of the load sheave in the winding-off direction, a load is always wound-off at a set speed safely without increasing the lowering speed to an extent in excess of the rotating speed of the DC motor. Moreover, the load is securely held at its stopped position during the stoppage of the electric chain block.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A stepless speed change electric chain block including; a DC motor for driving a load sheave, comprising a phase control circuit having a variable resistor, a capacitor, a two-way trigger diode, an alternating current source, and a triode AC switch for receiving alternating current from said alternating current source to control the phase of said alternating current, a full-wave-rectifier for receiving alternating current from said phase control circuit to convert said alternating current into direct current which is supplied into the DC motor, mechanical brake means provided in a transmission between said DC motor and said load sheave for braking rotation of the load sheave in a lowering direction, an operating circuit including a lifting circuit having a lifting operation switch, a normally closed contact pair of a lowering operation relay and a lifting operation relay connected in series and a lowering circuit having a lowering operation switch, a normally closed contact pair of a lifting operation relay and a lowering operation relay connected in series, and a normal and reverse rotating circuit including normally opened contact pairs of said lifting operation relay and normally opened contact pairs of said lowering operation relay, and further comprises a series circuit having a dynamic brake resistor connected in series to said normally closed contact pair of said lifting operation relay and said normally closed contact pair of said lowering operation relay, said series circuit is connected in parallel with said DC motor.

2. A stepless speed change electric chain block including; a DC motor for driving a load sheave, comprising a phase control circuit having a variable resistor, a capacitor, a two-way trigger diode, a source of alternating current, and a triode AC switch for receiving alternating current from said alternating current source to control the phase of said alternating current, a full-wave-rectifier for receiving alternating current from said phase control circuit to convert said alternating current into direct current which is supplied into the DC motor, and mechanical brake means provided a transmission between said DC motor and said load sheave for braking rotation of the load sheave in a lowering direction, wherein said mechanical brake means comprises a cam support rotatably and axially slidably fitted on a load sheave shaft, a retainer disc fitted on said load sheave shaft axially slidably but nonrotatably relative thereto, a brake receiving disc fitted on the load sheave shaft axially slidably but nonrotatably relative thereto, a ratchet wheel rotatably fitted on a boss of the brake receiving disc, a pawl pivotally mounted on a stationary member of the block and urged into engagement with the ratchet wheel by resilient means, an intermediate driven gear fitted on said cam support axially slidably but against rotation thereto, a resiliently urging means for holding said ratchet wheel through said retainer disc, said brake receiving disc and the intermediate driven gear, and brake releasing cam members received in cam grooves each formed in one side of said cam support and having a sloped bottom to change its depth, thereby causing said brake releasing cam members to move into deeper positions in the cam grooves when the cam support is rotated in a lifting direction, and into shallower positions in the cam grooves when the cam support is rotated in a lowering direction.

* * * * *